United States Patent [19]

Brice

[11] Patent Number: 4,689,913

[45] Date of Patent: Sep. 1, 1987

[54] COLLAPSIBLE DECOY

[76] Inventor: Ronnie V. Brice, R.R. 2, Box 487, Henryetta, Okla. 74437

[21] Appl. No.: 883,557

[22] Filed: Jul. 9, 1986

[51] Int. Cl.⁴ .............................................. A01M 31/06
[52] U.S. Cl. ........................................................ 43/3
[58] Field of Search .................. 446/373, 370, 375; 43/3, 2; 135/112, 102, 19.5, 20

[56] References Cited

U.S. PATENT DOCUMENTS

| | | | |
|---|---|---|---|
| 547,032 | 10/1895 | Ross | 43/3 |
| 708,049 | 9/1902 | Jordan | 135/102 |
| 812,499 | 2/1906 | Johnston | 43/3 |
| 1,598,619 | 9/1926 | Reynolds | 43/3 |
| 2,478,585 | 8/1949 | Kouba | 43/3 |
| 2,545,800 | 3/1951 | Viken | 43/3 |
| 2,812,608 | 11/1957 | Jones | 43/3 |
| 2,994,333 | 8/1961 | Halpern | 135/19.5 |
| 3,245,168 | 4/1966 | Pool | 43/3 |
| 3,770,645 | 10/1969 | Mattson | 43/3 |

Primary Examiner—Nicholas P. Godici
Assistant Examiner—Karen Skillman
Attorney, Agent, or Firm—Head, Johnson, Stevenson

[57] ABSTRACT

A collapsible decoy is made of a collapsible frame with a flexible covering. The frame includes a first large wire arch with a wire tail and head configuration attached and a second wire arch. A pivot connects the large arch with the second arch so that the two can be rotated to be essentially one on top of the other in a flat position and then rotating 90° to an expanded position. An anchoring pole is fixed to the larch arch so that the decoy can be supported from the ground.

6 Claims, 6 Drawing Figures

COLLAPSIBLE DECOY

BACKGROUND OF THE INVENTION

1. Field of the Invention

The invention relates to a collapsible fowl decoy and more particularly is directed toward a decoy which is adapted to be folded to a flat position from an extended position wherein it has the general shape of a duck or goose or the like.

2. Background of the Invention

People have been hunting birds such as ducks and geese for centuries. They are continually devising ways to lure the birds and especially the ducks and the geese in close to where the hunters may be waiting in a sheltered area called a "blind". One method of luring the ducks and geese that many hunters feel is successful is by the use of decoys. The decoy is generally constructed to resemble a duck or goose as the case may be. These decoys are placed near the blind. In a large part of the United States the trend is to hunt the geese at their feeding grounds rather than on the water. A large number (e.g., 40–50) of decoys will be placed on the ground close together in a small area of the feeding grounds close to the blind. There have been many patents issued on decoys. These include the following U.S. Pat. Nos.: 547,032; 812,499; 833,966; 1,598,619; 2,478,585; 2,545,800; 2,812,608; 3,245,168; and 3,470,645. U.S. Pat. No. 812,499 is typical of the various patents and is a simple decoy which can be folded to a small space but has a rather complicated frame system.

SUMMARY OF THE INVENTION

This is a rather simple collapsible fowl decoy which is very easy to construct and is sturdy and effective. It includes a first large wire arch which has a tail section and a head section. The main portion of the first large arch more or less follows the general line of a back of a fowl such as a goose. A second wire arch is pivotally attached at about its mid point to the mid point of the larger arch. An anchoring pole is fixed at one of its ends to one of the arches. A flexible covering is mounted over the large arch including the head and tail and the second arch. The bottom portion of the covering is left oopen.

The arches are such that they can be rotated with respect to each other until they are flat. By rotating the arches 90° with respect to each other they can be fully expanded so that the flexible covering takes the general shape of a bird. The fabric may be decorated such as by a silkscreen or the like to resemble a duck or goose image.

The decoys can be collapsed into a very flat position and stacked in boxes by the dozens and carried to the field where they are to be placed. They are then easily extended from the collapsed position to resemble a duck. Then the anchoring pole can be shoved into the ground. The anchoring pole preferably has a forked lower end so that the decoys will not rotate in the wind but will stay in essentially the position in which they are first placed. After the hunting is over, the decoys can be quickly pulled up, collapsed and placed in their carrying boxes.

It is thus an object of this invention to provide a collapsible decoy which is very easy to manufacture and use.

It is a further object of this invention to provide a collapsible decoy that is easy to place in the field and easy to retrieve.

DETAILED DESCRIPTION OF THE INVENTION

Figure 1:
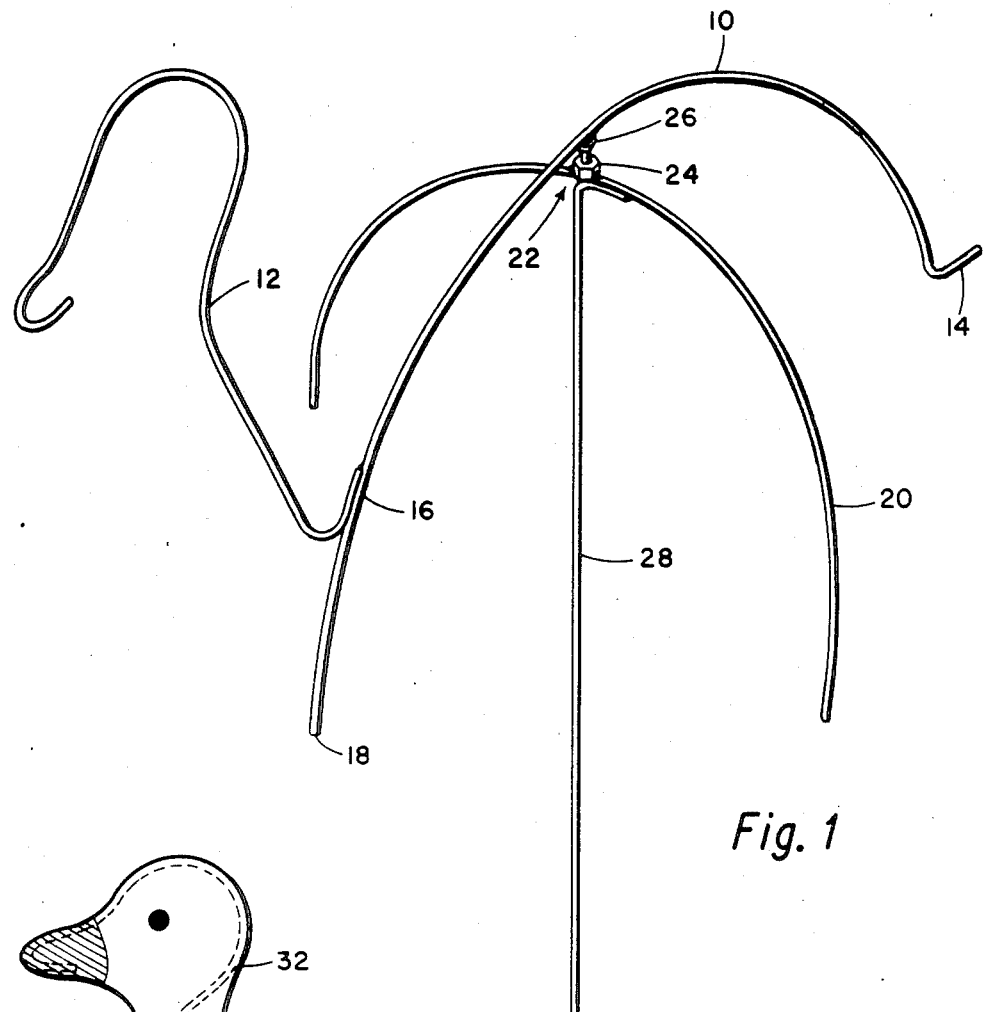
FIG. 1 is an isometric view of the frame of the decoy in expanded position.

Attention is first directed to FIG. 1 which shows an isometric view of the decoy frame in expanded position. Shown thereon is a pair of more or less U-shaped wire frame segments. These include a curved back frame 10 having a head and neck extension 12 and a relatively short tail extension 14. The neck extension 12 is attached to the frame 10 at a point 16 which is spaced from the end 18 to more or less conform to the general shape of a goose. The other U-shaped frame section is a curved lateral frame 20. Frames 10 and 20 are pivotally connected by pivot 22 which is intermediate the ends of frames 10 and 20. Pivot 22 is preferably nearly in the center of frame 20. Frames 10 and 20 are positioned with respect to each other such that the frame text is in the appropriate shape so that it would be useful as a frame for a decoy.

The pivot 22 can take various shapes. The one that is shown is a nut 24 welded or otherwise secured to lateral frame 20 and a bolt or screw 26 which had its head welded to the back frame 10 and is threaded into nut 24. Nut 24 can be a lock nut which merely means that it will require a little more force to turn the bolt 24 with respect to the nut 24 than with the ordinary nut. This force should not be too great but should be enough to cause the frame 20 to stay in any position with respect to frame 10 to which it may be manually pushed.

Figure 3:
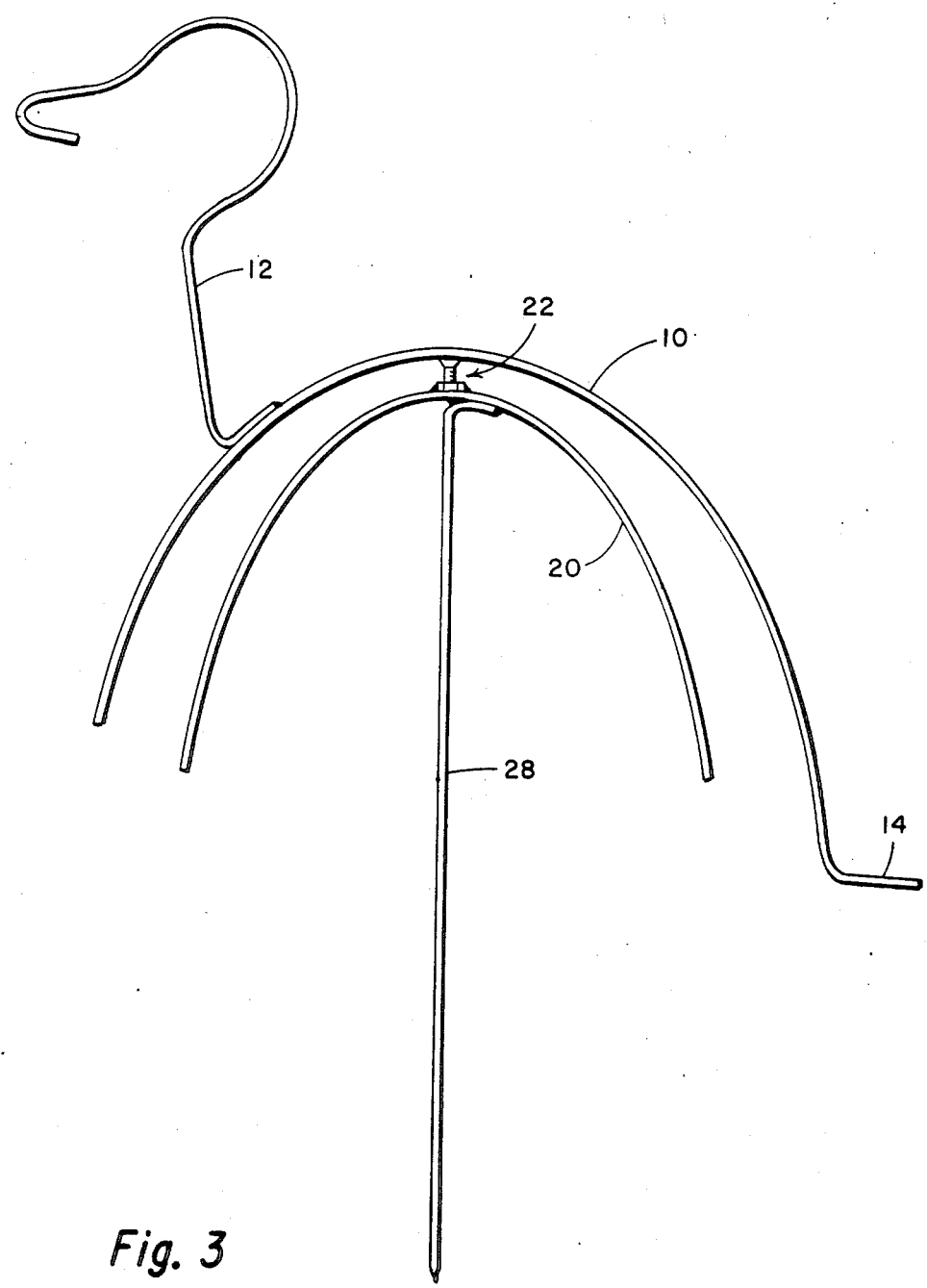
FIG. 3 is similar to FIG. 1 except that the frame is shown in its collapsed position.

Also shown in FIG. 1 is an anchor rod 28 which is welded or otherwise attached to frame 20. This frame including the back frame 10, the lateral frame 20 and the neck 14, extension 12 and the anchor rod 28 can be made of any suitable material which will retain its shape under the conditions contemplated in here. It is contemplated that the frames will most normally be made of steel wire or an appropriate size and stiffness FIG. 3 shows the frame of FIG. 1 in a collapsed position. That is, lateral frame 20 has been moved with respect to back frame 10 so that they lie in essentially a plane.

Figure 2:
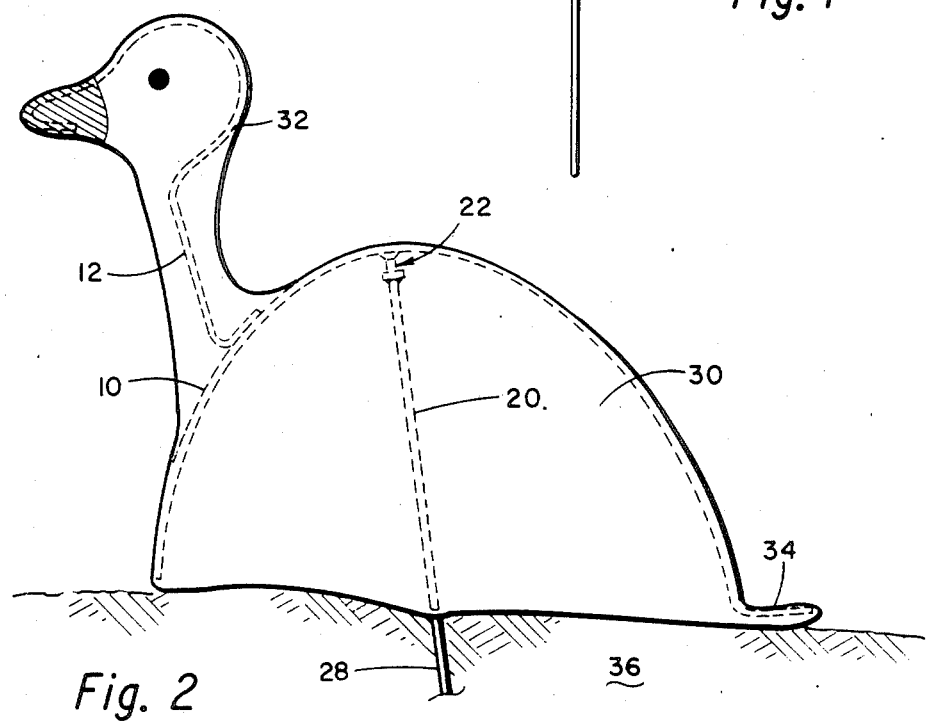
FIG. 2 shows a covering over the frame of FIG. 1 to form a decoy which is supported from the ground.

Attention is directed next to FIG. 2 which is a side view of the decoy of FIG. 1 with a flexible cover 30 mounted thereon. The cover 30 is cut and sewn to fit over the frame of FIG. 1. The material is opened at the bottom and is more or less partially bell-shaped with a head section 32 and a tail section 34. The cover can be made of any suitable flexible material and is preferably made of a synthetic material such as Dacron ® polyester so that it will withstand the weather to which it will be subjected. The covering can also be of any color which is useful in making the decoy look more acceptable to the fowl such as geese for which there is to be an attempt to lure in. As also shown in FIG. 2, the anchor rod 28 is shoved into the ground 36. In many fields across a large part of the country there is ample grain to attract birds such as geese. A large amount of the grain is inadvertently left there when the farmer harvests his crop. In other areas grain crops may be planted and left standing for the geese. In areas in times when hunting is permitted, hunters will put out a blind on these fields. Sometimes these fields may be several hundred acres in size so the hunter tries to lure the geese close to his blind. One way of doing this is by the use of decoys which are placed close to the blind. There will normally be at least 40–50 decoys put out. By use of decoys of my invention I can carry 40 or 50 in very little space in the trunk of an ordinary passenger car. I would carry them in the collapsed position such as a frame shown in FIG. 3. Inasmuch as the frame is collapsed to a flat position and the covering 30 is flexible, then the covering lies flat too. Thus, 40 or 50 of these would take up very little space. When I arrive at the hunting site, I merely carry these out to the desired location, quickly unfold them from the position of FIG. 1 and then shove the anchor rod 28 to the ground. This takes very little time. These can be left in position for as long as desired. When the hunt is over, I merely pull these decoys out of the ground, flatten them as shown in FIG. 3 and then stack them in a carrying box or in the truck of a car or whereever I may desire.

Figure 4:
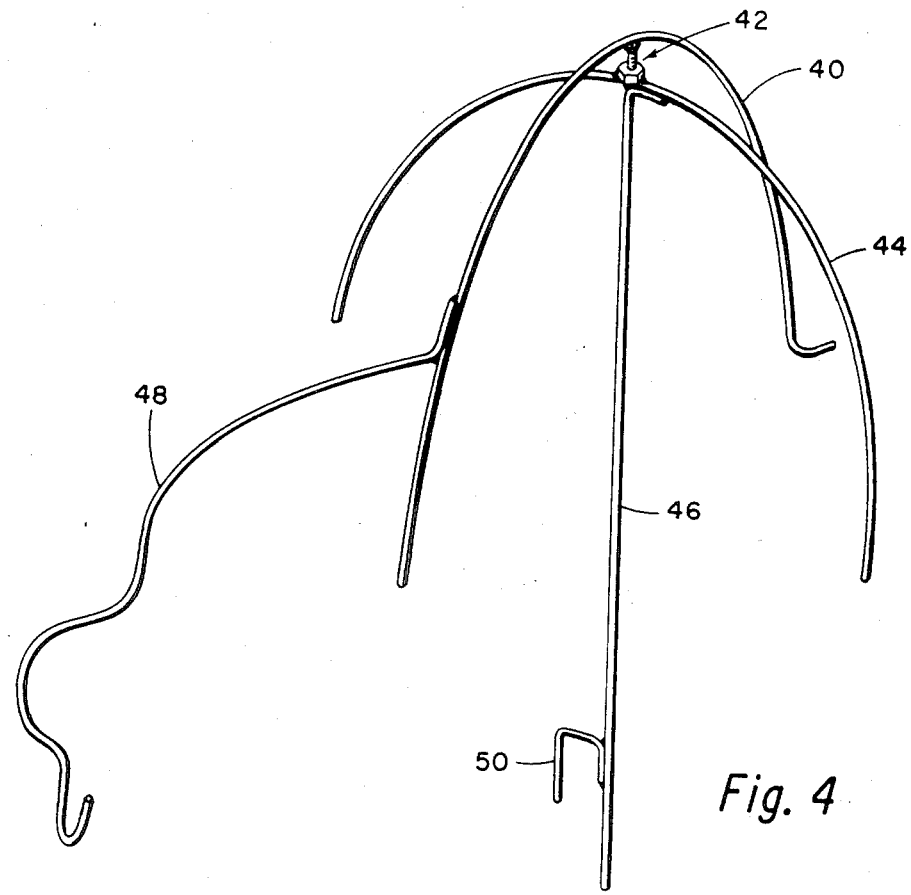
FIG. 4 is similar to FIG. 1 except that the frame has a goose head extension to simulate the feeding position.
Figure 5:
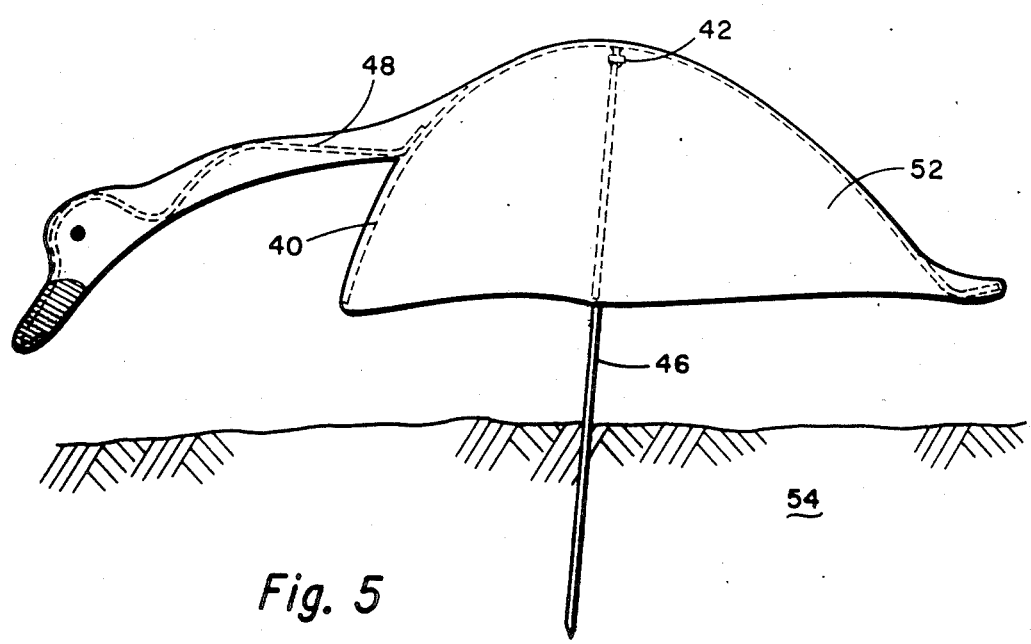
FIG. 5 is the frame of FIG. 4 with a covering to form a facsimile of a goose.
Figure 6:
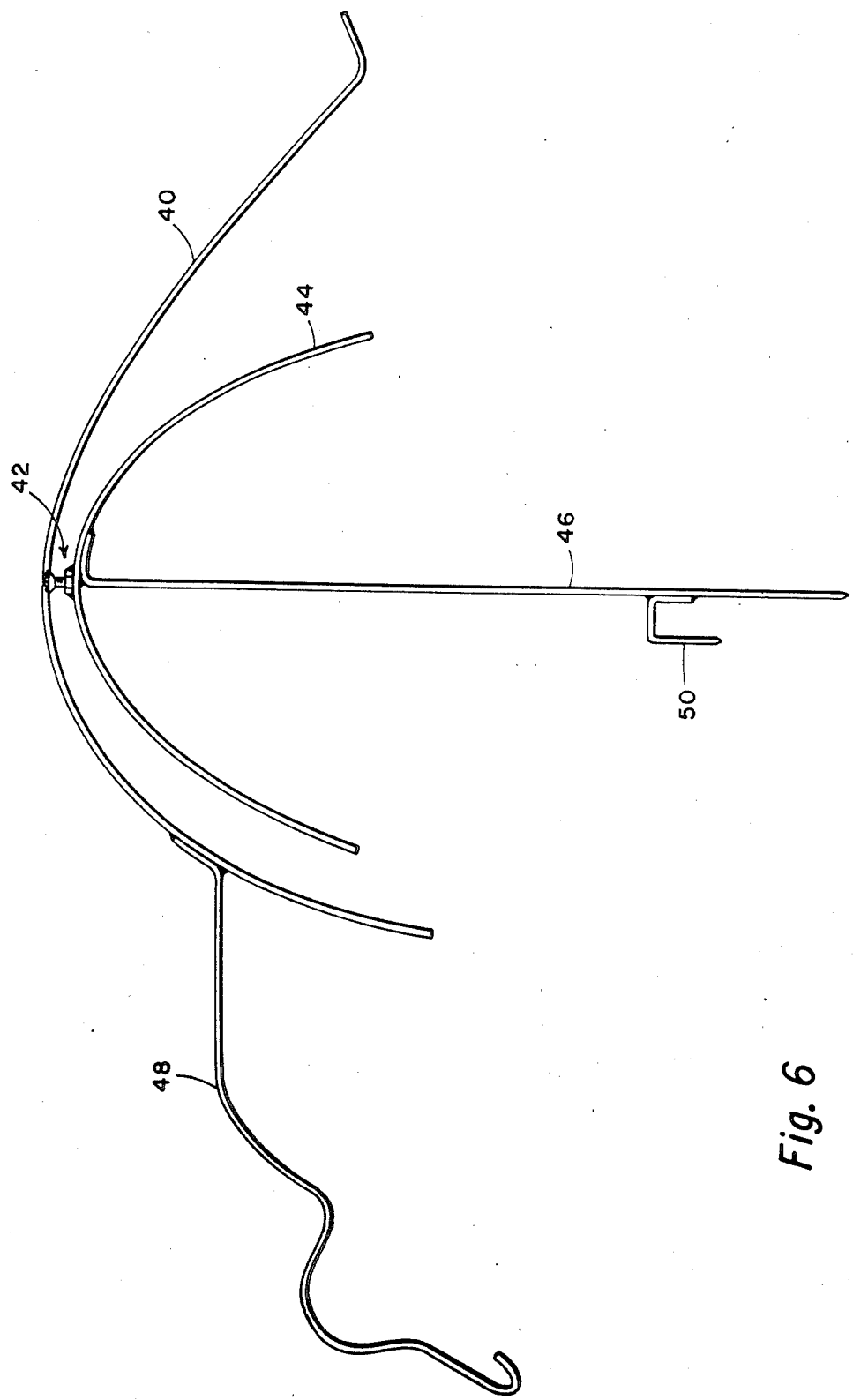
FIG. 6 is similar to FIG. 4 except the frame is in the collapsed position.

In the decoy shown as FIGS. 1, 2 and 3, the head of the decoy is up. A part of the decoys put out in the fields should be such that they appear to be in the eating position. This is illustrated in FIGS. 4, 5 and 6. Shown in FIG. 4 is a back frame 40 connected by pivotal connecting means 42 to a lateral frame 44. An anchor 46 is connected to frame 44. Back frame 40 has a neck 48 which is bent to assume a feeding position which is different from the position shown in the decoy of FIGS. 1, 2 and 3. Another difference is the addition of a prong or tang 50 secured to anchoring rod 46 near its lower end. The purpose of tang 50 is to prevent the decoy from rotating about anchor rod 46 when it is placed in the field in the presence of wind. I can place the individual decoys in a certain position with the heads pointed in a selected direction and they will maintain such position.

FIG. 5 shows a frame of FIG. 4 with a covering 52 thereon which is similar to a covering 30 of FIG. 2. The anchor rod 46 is thrust into ground FIG. 5 shows a frame of FIG. 4 with a covering 52 thereon which is similar to a covering 30 of FIG. 2. The anchor rod 46 is thrust into ground 54. Attention is next directed to FIG. 6 which shows the frame of FIG. 4 in a collapsed position.

While the invention has been described with a certain degree of particularlity, it is manifest that may changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A collapsible fowl decoy consisting of:
   a generally U-shaped first wire frame living in a single plane;
   a U-shaped second wire frame lying in a single plane;
   a neck extension fixed to said second wire frame and lying in said single plane;
   the only frame lies wholly in said single plane;
   a pivot means for pivotally connecting an intermediate point on said first wire frame and an intermediate point on said second wire frame such that the wire frames can be rotated between an enhanced position and a collapsed flat position, there being no connection between said first wire frame and said second wire frame other than said pivot means;
   a flexible covering over said first and second wire frame and said neck extension;
   a ground anchor rod connected to said second frame.

2. A collapsible fowl decoy as defined in claim 1 in which said pivot means includes a nut secured to said second frame and a bolt secured to said first frame which is screwed into said nut.

3. A collapsible fowl decoy as defined in claim 1 in which said pivot means includes a nut fixed to one of said wire frames and a bolt fixed to the other wire frame and screwable into said nut.

4. A collapsible fowl decoy comprising:
   (1) a frame consisting of:
      (a) a U-shaped first frame lying in a first plane;
      (b) a U-shaped second frame lying in a second plane;
      (c) a neck extension fixed to said second frame and in the same plane as said second frame's plane;
      (d) a single pivot for pivotally connecting intermediate points of said first and second frames, said decoy having no other pivot or connection between said first and second frame;
      (e) a ground rod fixed to an intermediate point along said first frame;
   (2) a flexible covering mounted on said frame to simulate a fowl when the plane of said first frame is rotated 90° with respect to the plane of said second frame.

5. A collapsible decoy comprising:
   a curved back frame made of a wire segment;
   a curved lateral frame made of a wire segment;
   a neck extension frame attached to said back frame;
   only one pivot means for pivotally connecting an intermediate point along said back frame with an intermediate point along said side frame so that the back frame can be rotated with respect to said lateral frame between a flat position and an expanded position, said pivot means being the only connector between said back frame and said lateral frame;
   a support rod connected to one of said frames;
   a flexible covering for said frames.

6. A collapsible fowl decoy as defined in claim 5 in which said support frame includes a second and shorter rod supported from and spaced from the end of said rod away from said frame.

* * * * *